A. SUNDH.
COMBINED FRICTION AND SPUR GEARING.
APPLICATION FILED NOV. 11, 1911.

1,127,313.

Patented Feb. 2, 1915.

Witnesses:
J. F. Rule
Ernest L. Gale Jr.

August Sundh
Inventor

By his Attorney
L. N. Campbell

UNITED STATES PATENT OFFICE.

AUGUST SUNDH, OF HASTINGS-UPON-HUDSON, NEW YORK.

COMBINED FRICTION AND SPUR GEARING.

1,127,313.  Specification of Letters Patent.  Patented Feb. 2, 1915.

Application filed November 11, 1911. Serial No. 659,703.

*To all whom it may concern:*

Be it known that I, AUGUST SUNDH, a citizen of the United States, residing at Hastings-upon-Hudson, in the county of Westchester and State of New York, have invented a new and useful Improvement in Combined Friction and Spur Gearing, of which the following is a specification.

My invention relates to mechanism adapted for the transmission of power and in which a train of friction gears is combined with spur gearing, the latter being designed to prevent excessive slippage of the friction gears and also to prevent the load from being permanently thrown on the spur gearing.

The exact nature of the invention and the specific objects sought to be obtained will appear more fully hereinafter.

Figure 1:
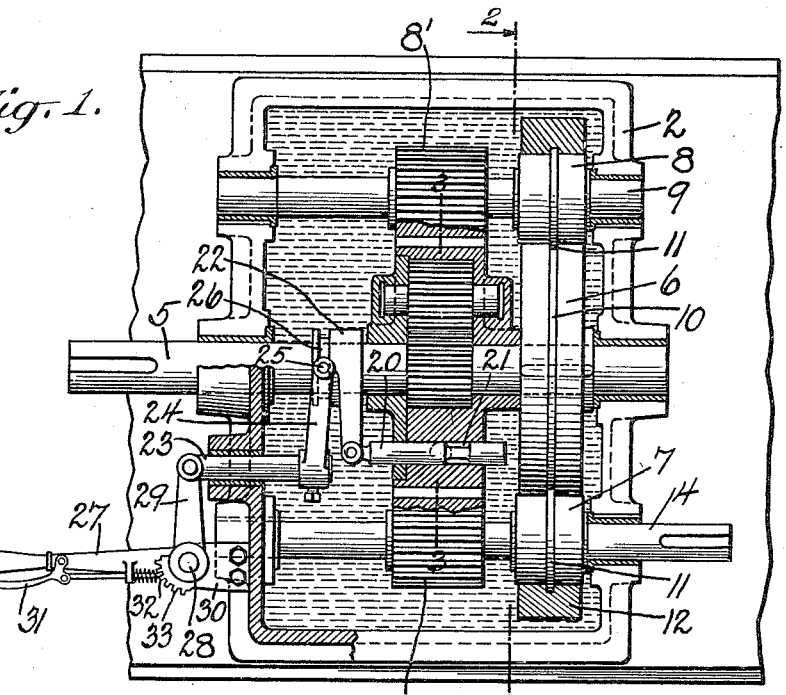
Figure 2:
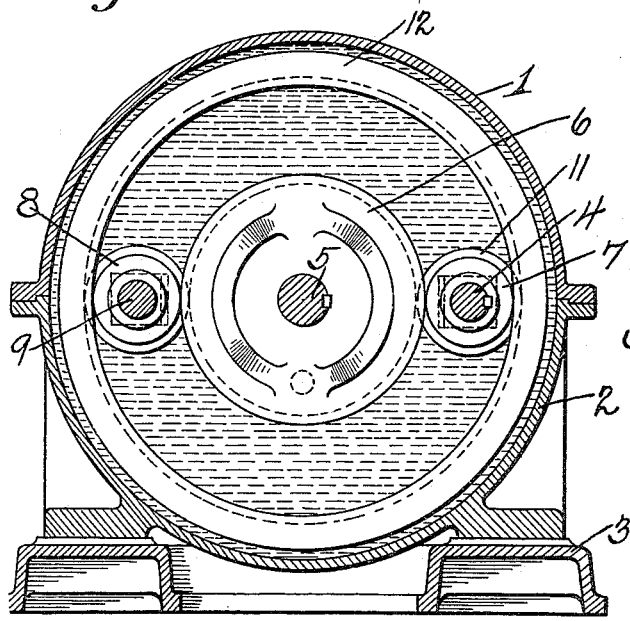
Figure 3:
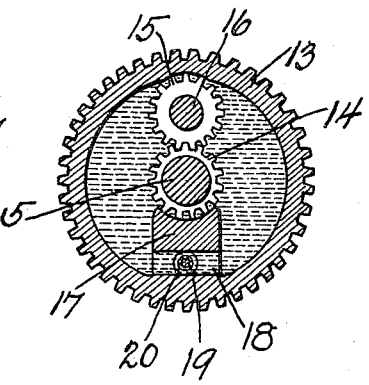

In the accompanying drawings which illustrate a structure embodying my invention, Figure 1 is a part sectional plan view of the mechanism; Fig. 2 is a sectional elevation view as indicated by the section line 2—2 of Fig. 1; and Fig. 3 is a sectional view of a portion of the spur gearing as indicated by the line 3—3 on Fig. 1.

The gearing is preferably inclosed in an oil casing comprising an upper section 1 and a lower section 2 mounted on a base 3. In Fig. 1 the upper or cover section is removed to show the mechanism within the casing. The latter is preferably filled with oil. A drive shaft 4 is journaled in adjustable bearings in the casing and is adapted to be connected with an engine, electric motor or other suitable source of power. A driven shaft 5, extending through the center of the casing and having bearings in the walls of the casing, is adapted to be connected to any device which it is desired to operate by the power transmitted through the gearing. Keyed to the driven shaft 5 is a friction wheel or roller 6 in rolling frictional contact with a friction roller 7 keyed to the drive shaft. An idler friction roller 8 is mounted on the shaft 9 adjustably journaled in the casing and runs in contact with the roller 6. An annular groove 10 formed in the periphery of the roller 6 coöperates with collars or projections 11 formed on the rollers 7 and 8 to prevent relative movement of the friction rollers in an axial direction. Surrounding the friction rollers is an annular member or ring 12 in frictional rolling contact with the rollers 7 and 8. This ring is supported by the rollers and serves to hold them together with sufficient pressure to prevent undue slipping.

The spur gearing comprises a hollow spur gear 13 loosely mounted on the driven shaft 5. Pinions 7' and 8' mounted on the shafts 4 and 9 respectively intermesh with the hollow gear 13. Within this hollow gear wheel is a pinion 14 secured to the shaft 5 and a gear wheel 15 meshing with the pinion 14. The wheel 15 may be mounted on a stub shaft 16 journaled in the walls of the hollow gear 13. A wall or partition 17 is formed in the lower portion of the hollow gear wheel and serves, together with the gears 14 and 15, to divide the interior of the wheel 13 into two separate chambers. An opening or port 18 extends through the wall 17. Extending through said wall at right angles to the port 18 is an opening 19 forming a valve chamber in which is a reciprocating valve 20. The valve 20 has a reduced section 21, which, when the valve is moved to the left from the position shown in Fig. 1 permits a free flow of liquid through the port 18. The reduced portion 21 of the valve is preferably so positioned that when the valve is moved to the right, Fig. 1, the port 18 is not completely covered, but a restricted passage is maintained through said port. The valve is operated by the following mechanism: A sleeve 22 is freely mounted on the shaft 5 so as to be slidable longitudinally thereof. This sleeve has an extension in the form of an arm which is connected to the valve 20. A rod 23 is slidable longitudinally in the casing and has secured thereto at its inner end an arm 24, the upper end of which is provided with lugs 25 engaging an annular recess 26 in the sleeve 22. A hand lever 27 is connected to a pivot rod 28 journaled in the bracket 30. An arm 29 forms a connection between the rod 28 and the rod 23. A finger latch 31 is connected to a pawl 32 coöperating with a rack 33 for holding the lever 27 in any desired position of adjustment.

The operation of the mechanism is substantially as follows: When the drive shaft 4 is rotated the power is normally transmitted through the friction gears 7 and 6 to rotate the driven shaft 5. The spur gears therefore run idly, no power being transmitted through them. If, however, any slipping should take place between the friction wheels 7 and 6 the load will be temporarily transferred to the friction gears. That is, the pinion 7' will drive the hollow gear 13. If at this time the valve port 18 were completely closed, so that the oil or other liquid within the hollow gear cannot be pumped from one side of the partition 17 to the other by the pump gears 14 and 15, the hollow gear 13 would positively drive the shaft 5 the same as though it were fixed thereto. The restricted passage, however, through the wall 17, permits a slow rotation of the pump gears 14 and 15 about their own axes, so that the angular velocity of the hollow gear 13 may be somewhat less than that of the shaft 5 to which the pinion 14 is secured. This relative movement or slippage of the wheel 13 permits the load to again be transferred to the friction driving wheels. It will thus be seen that in case of slippage between the friction wheels 7 and 6 the load is immediately taken up by the spur gearing, and any extensive slippage of the friction wheels is prevented. The slippage or restricted pumping action within the hollow gear 13, however, permits the load to be quickly taken up again by the friction wheels. The spur gearing forms practically a positive driving connection between the drive shaft and the driven shaft, but the restricted fluid connection within the gear 13 permits the latter to run at a somewhat reduced speed, so that the load will be maintained by the friction gears except when slipping takes place. By adjusting the hand lever 27, the port 18 can be throttled to any desired extent. If the valve is moved to the left, so that the port 18 is unrestricted, the pump gears 14 and 15 will be enabled to rotate freely within the gear 13 and no power can be transmitted through the latter.

My invention comprehends such modifications as would properly come within the scope of the appended claims.

What I claim as new and desire to secure by Letters Patent of the United States is:—

1. The combination of power transmitting mechanism comprising members in frictional driving contact, and means actuated by liquid pressure to temporarily transmit the power when slipping occurs between said members, and to again permit the friction members to transmit the power.

2. The combination of a driving element, a driven element, frictional driving mechanism connecting said elements and through which power is transmitted, and mechanism between said elements operable to transmit the power by fluid pressure when slippage occurs in said frictional mechanism.

3. The combination of driving and driven elements, friction gears between said elements, additional gearing between said elements, and means in connection with said additional gearing causing it to normally run free and permitting it to transmit power by means of fluid pressure when slippage occurs between the friction gears.

4. The combination of a driving element, a driven element, friction gearing forming a driving connection between said elements, a train of positive driving gears between said elements, and means interposed between one of said gears and one of said elements to cause said parts to move together with a retarded relative movement of said gear and element.

5. A train of friction gearing in combination with a train of positive gearing, an element operatively connected to said trains of gearing, and means to cause a retarded idle movement of said positive gearing relatively to said element.

6. The combination of a driving element, a driven element, a train of friction gearing between said elements, a parallel train of spur gearing, and means whereby one of said elements may be moved independently of said spur gearing.

7. In combination, parallel shafts, coöperating friction rollers connected to said shafts, a spur gear secured to one of the shafts, an intermeshing spur gear mounted on the other shaft, and means to form a driving connection between said last named gear and shaft and permitting a slow relative rotation of the gear and shaft.

8. In combination, driving and driven members, parallel trains of gearing between said members, a fluid driving connection between one of said members and a train of gearing, and means associated with said fluid connection to cause a variation in the relative speed of parts connected thereby.

9. The combination of intermeshing pump gears, a shaft to which one of said gears is secured, a hollow gear wheel inclosing said pump gears, a fluid therein adapted to be circulated by the pump gears, means to throttle the fluid and thereby permit a driving action between said shaft and hollow gear wheel, a second shaft, a gear wheel connecting said second shaft and the hollow gear wheel, and friction gearing forming a driving connection between said shafts.

10. In combination, a casing, shafts journaled therein, friction gears connecting said shafts, spur gears between the shafts, and a fluid driving connection between one of said spur gears and a shaft permitting a retarded relative movement of said last named spur gear and shaft.

11. The combination of friction gears in rolling contact, a floating ring surrounding said gears, a drive shaft and a driven shaft connected to said gears, a train of spur gears having a positive driving connection with one of said shafts, a fluid forming a driving connection between the other shaft and said spur gears, and means to cause a restricted local circulation of the liquid and thereby permit slippage between the shaft and spur gears.

12. The combination of parallel trains of friction and spur gears, a fluid forming a driving element in the train of spur gears, means to cause a retarded circulation of the fluid and thereby permit slippage in the train of gears, and adjusting means to regulate the retardation of said fluid.

13. The combination of a drive shaft, a driven shaft, a hollow gear wheel mounted on one of said shafts, pump gears within said hollow gear wheel, a liquid within said gear wheel and forming a driving connection between the shaft and hollow gear wheel, means to cause a restricted circulation of the liquid when the pump gears are operated, a valve controlling said circulation, means for adjusting said valve, and thereby varying the restriction of the liquid, a driving connection between said hollow gear and the other of said shafts, a train of friction gears between said shafts, and a casing inclosing the gearing.

In testimony whereof, I have signed my name to this specification in the presence of two subscribing witnesses.

AUGUST SUNDH.

Witnesses:
JAMES G. BETHELL,
J. F. RULE.

Copies of this patent may be obtained for five cents each, by addressing the "Commissioner of Patents, Washington, D. C."